(12) United States Patent
Shaffer et al.

(10) Patent No.: US 8,513,367 B2
(45) Date of Patent: Aug. 20, 2013

(54) MITIGATION OF ELASTOMER REACTOR FOULING USING MECHANICAL VIBRATION

(75) Inventors: Timothy D. Shaffer, Hackettstown, NJ (US); Pamela J. Wright, Easton, PA (US); George P. Akehurst, Belvidere, NJ (US); Limin Song, West Windsor, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/294,276

(22) Filed: Nov. 11, 2011

(65) Prior Publication Data

US 2012/0130026 A1  May 24, 2012

Related U.S. Application Data

(60) Provisional application No. 61/415,424, filed on Nov. 19, 2010.

(51) Int. Cl.
 *C08F 2/12* (2006.01)
 *C08F 8/20* (2006.01)
 *C08F 210/12* (2006.01)
 *B01J 19/18* (2006.01)

(52) U.S. Cl.
 USPC ............... 526/88; 526/64; 526/339; 526/920; 525/332.3; 528/484

(58) Field of Classification Search
 USPC ................... 526/74, 88, 920, 64; 525/332.3; 528/484; 422/132
 See application file for complete search history.

(56) References Cited

U.S. PATENT DOCUMENTS

| | | | | |
|---|---|---|---|---|
| 2,474,592 | A | * | 6/1949 | Palmer ............................ 526/88 |
| 2,631,984 | A | * | 3/1953 | Crawford et al. ............. 523/328 |
| 2,941,975 | A | * | 6/1960 | Minckler, Jr. et al. ........ 525/371 |
| 2,999,084 | A | | 9/1961 | Arnold et al. |
| 5,417,930 | A | | 5/1995 | McDonald, Jr. et al. |
| 5,461,123 | A | | 10/1995 | Song et al. |
| 7,726,871 | B2 | | 6/2010 | Song et al. |
| 2005/0095176 | A1 | | 5/2005 | Hottovy |
| 2005/0277748 | A1 | | 12/2005 | Kimoto et al. |
| 2007/0144631 | A1 | | 6/2007 | Clavenna et al. |

(Continued)

FOREIGN PATENT DOCUMENTS

| EP | 0107127 A1 | 5/1984 |
|---|---|---|
| WO | WO 98/29186 | * 7/1998 |

OTHER PUBLICATIONS

International Search Report issued May 12, 2012 in corresponding PCT Application No. PCT/2011/060908 (4 pgs.).

(Continued)

*Primary Examiner* — Fred M Teskin
(74) *Attorney, Agent, or Firm* — Glenn T. Barrett; Malcolm D. Keen

(57) ABSTRACT

Method of reducing fouling in an elastomer polymerization process that includes providing a reactor capable of housing an industrial-scale elastomer polymerization reaction, and applying a mechanical force to the reactor so as to create a vibration in at least one wall of the reactor, in which fouling is reduced in the reactor. In one embodiment the reaction is an industrial scale butyl polymerization reaction and the reactor is a butyl polymerization reactor.

9 Claims, 3 Drawing Sheets

(56) References Cited

U.S. PATENT DOCUMENTS

2007/0267175 A1 11/2007 Yeganeh et al.
2007/0267176 A1 11/2007 Song et al.
2008/0073063 A1 3/2008 Clavenna et al.
2008/0149308 A1 6/2008 Song et al.
2009/0090613 A1 4/2009 Cody et al.

OTHER PUBLICATIONS

Written Opinion issued May 12, 2012 in corresponding PCT Application No. PCT/2011/060908 (8 pgs.).

* cited by examiner

MITIGATION OF ELASTOMER REACTOR FOULING USING MECHANICAL VIBRATION

CROSS REFERENCE TO RELATED APPLICATION

This application relates and claims priority to U.S. Provisional Patent Application No. 61/415,424, filed on Nov. 19, 2010.

FIELD

The present invention relates to methods and systems for reducing fouling (e.g., rubber fouling) of reactors and other equipment used to synthesize elastomers (e.g., butyl rubber).

BACKGROUND

The heat transfer surfaces in elastomer reactors, including butyl rubber reactors, foul due to the progressive accumulation of elastomer during operation. This accumulation leads to a decrease in the heat transfer coefficient between the reactor slurry and the refrigerant (e.g., ethylene) and consequently an increase in the polymerization/slurry temperature. Ultimately, the slurry temperature becomes too high for polymerization to continue because of reduced slurry stability and reduction of the molecular weight of the polymer. The reactor then must be taken off line, warmed to above ambient temperature and solvent washed before being refilled with feed and chilled back down to the polymerization temperature.

As disclosed in U.S. Pat. No. 5,417,930, hereby incorporated by reference in its entirety, in elastomer synthesis techniques, liquid chemical raw materials are catalytically converted into elastomeric solids or semi-solids, as in the production of synthetic rubber from low boiling hydrocarbons. A reaction mixture is circulated as a slurry in a reactor into which reactants and catalysts are injected, and product withdrawn. For example, isobutylene can be polymerized with a diolefin in the presence of a Friedel-Crafts type catalyst (e.g., an aluminum halide catalyst) dissolved in a diluent of low freezing point (e.g. at temperatures of about −100° F. to −160° F.) to produce butyl rubber. For this reaction, a back-mixed reactor can be employed; such as a one-tube pass system as disclosed in U.S. Pat. No. 2,474,592, which is hereby incorporated by reference. Such a reactor generally has a vertically oriented elongate vessel formed by an enclosing side wall. Within the sidewall an axially mounted draft tube is provided of relatively large diameter, surrounded by a relatively large number of small diameter tubes which extend downwardly from an upper common plane to a lower common plane, where the upper and lower terminal ends of the small diameter tubes and draft tube, respectively, terminate. As is typical of many elastomer reactors and synthesis equipment, the outer walls of the reaction vessel form a jacket through which a liquid hydrocarbon refrigerant is circulated to remove the exothermic heat of reaction via heat exchange contact with the outer walls of the small diameter tubes, and wall of the central draft tube.

Polymer fouling can be a serious problem encountered in this type of reactor. Polymer deposits upon and fouls heat transfer surfaces within the reaction vessel; the polymer adhering tenaciously to the metal surfaces as a continuous film, and in severe cases as large masses of rubber. Although not entirely understood, this phenomenon is believed to be caused at least in part by local overheating. There is a tendency of the polymer to form or deposit on the reactor surfaces. This manner of polymer formation or deposition occurs when the polymer accumulates directly on the reactor surfaces, and is referred to herein as "film deposition" or "deposition." The rate of polymer film deposition on the reactor surfaces is generally proportional to the rate of polymerization, whereas particle agglomeration depends more on the characteristics of the slurry, flow conditions, particle adhesion, etc. As the film deposition accumulates, the heat transfer coefficient between the reactor slurry and the refrigerant decreases, leading to an increase in the polymerization temperature of the reactor slurry. As the reactor slurry temperature increases, the polymerization process becomes less stable and it is more difficult to achieve the desired molecular weight of the polymer product.

Additionally, during carbocationic polymerization processes, there can be a tendency of the polymer particles in the reactor to agglomerate with each other and to collect on the reactor wall, heat transfer surfaces, impeller(s), and the agitator(s)/pump(s). This is referred to herein as "polymer agglomeration," "particle agglomeration," or "agglomeration." The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained. Others have attempted to address these problems in reaction vessels. Several examples are US Patent Application Publication No. 2005/0095176 (Hottovy), US Patent Application Publication No. 2005/0277748 (Kimoto et al), and EP 0 107 127 A1 (Sumitomo), each of which are herby incorporated by reference in their entirety.

Hottovy discloses a loop reactor that can prevent the creation of fine particulates, or fines, during olefin polymerization wherein the process is suitable for the copolymerization of ethylene and a higher olefin. A first polymerization is generated that actually creates a film/coating on the reactor walls so that larger particulates formed during the desired polymerization are not broken or chipped by a non-smooth reactor wall.

Nonetheless, polymer fouling presents a serious problem and it has greatly limited the usefulness, as well as the efficiency of, elastomer reactors and synthesis equipment.

For example, it is reported in U.S. Pat. No. 2,999,084, hereby incorporated by reference, that "[c]ommercial experience has demonstrated that mass fouling is a limiting factor of prime importance with respect to the rate of production of tertiary isoolefin polymers in that fouling to an extent sufficient to inhibit adequate refrigeration will occur at erratic and unpredictable intervals within the range of about 10 to 90 hours." "When this happens, it is necessary to 'kill' the reaction medium and clean out the reactor before resuming the polymerization reaction," this normally requiring 10 to 20 hours. Polymer fouling results in poor heat transfer, and loss of efficiency in the process operation. If fouling is not controlled, the usefulness of the reactor is greatly curtailed.

Thus there is a need to reduce the fouling rate in elastomer reactors and synthesis equipment (e.g., butyl rubber reactors) in order to extend the time between reactor cleaning and washes and/or to increase the throughput of the reactor.

SUMMARY

One aspect of the presently disclosed subject matter provides a method of reducing fouling in an elastomer polymerization process that includes providing a reactor capable of housing an industrial-scale elastomer polymerization reaction, and vibrating a wall of the reactor to reduce accumulation of elastomer on the wall. In one embodiment, the reaction is an industrial scale butyl polymerization reaction, and the reactor is a butyl polymerization reactor.

Another aspect of the presently disclosed subject matter provides an elastomer polymerization system. They system includes an elastomer polymerization reactor (e.g., a butyl polymerization reactor used to produce butyl rubber) capable of housing an industrial-scale elastomer polymerization reaction, and a vibrator capable of vibrating a wall of the reactor to reduce accumulation of elastomer on the wall.

Another aspect of the presently disclosed subject matter provides a method of synthesizing butyl rubber that includes providing a supply of an isobutylene monomer, a supply of a diolefin, and a supply of a catalyst, introducing the supply of isobutylene monomer, the supply of diolefin, and optionally, the supply of catalyst to a polymerization reactor under conditions suitable to polymerize the isobutylene monomer and synthesize butyl rubber, and vibrating a wall of the reactor to reduce accumulation of butyl rubber. The vibration in the reactor wall mitigates rubber fouling thereby increasing the service time of the reactor and/or permitting a higher reactor throughput. In a preferred embodiment, the isobutylene monomer is an isobutylene monomer.

Another aspect of the presently disclosed subject matter provides a butyl rubber synthesizing system. The system includes a supply of a isobutylene monomer, a supply of a diolefin, a supply of a cooling fluid, and a supply of a catalyst (e.g. a Friedel-Crafts type catalyst), a jacketed polymerization reactor capable of receiving the supply of isobutylene monomer, the supply of diolefin, the supply of cooling fluid and optionally, the supply of catalyst under conditions suitable to polymerize the isobutylene monomer and synthesize butyl rubber; and a vibrator, positioned with respect to the jacketed polymerization reactor to vibrate at least one wall of the reactor.

BRIEF DESCRIPTION OF THE DRAWINGS

The application will now be described in conjunction with the accompanying drawings in which.

DETAILED DESCRIPTION

Definitions

Figure 1:
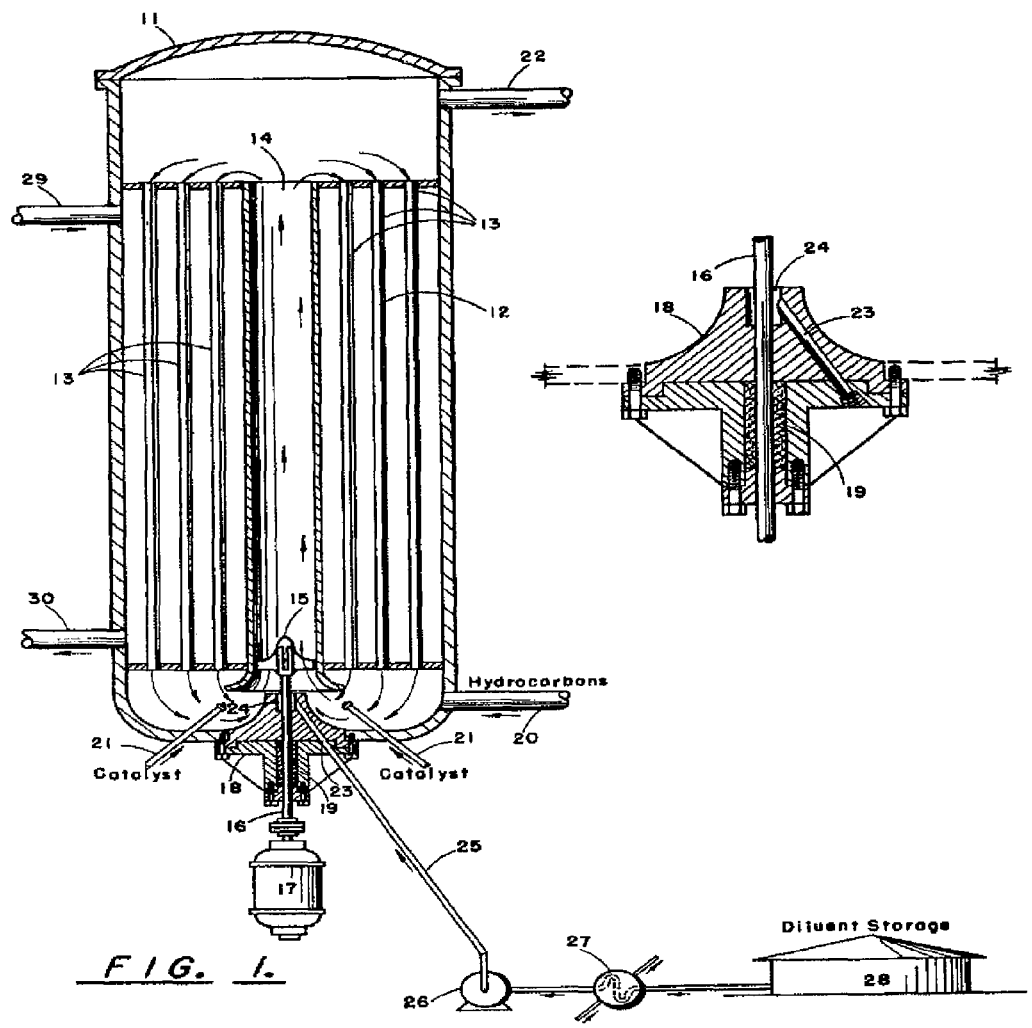
FIG. 1 shows a one-tube pass system butyl polymerization reactor as originally disclosed in U.S. Pat. No. 2,474,592.

The following definitions are provided for purpose of illustration and not limitation.

As used herein, the term "fouling" generally refers to the accumulation of unwanted materials, such as an elastomer, on the surfaces of processing equipment or the like.

As used herein, the term "butyl polymerization reaction" refers to a reaction in which a butyl monomer (e.g. isobutylene) is polymerized under controlled conditions to create a polymer chain. Generally, butyl polymerization reactions are highly exothermic and must be conducted under controlled low temperature conditions (e.g., −90 to −100° C.). In a preferred embodiment, butyl polymerization is performed to prepare butyl rubber, which contains predominately polyisobutylene with smaller amounts of isoprene. Butyl polymerization can optionally be conducted in the presence of a halogenation reagent to halogenate the butyl rubber.

As used herein, "reactor wall" or "wall of a reactor" refers to an internal or external surface of a reactor in which it is possible to apply a vibrational force to reduce fouling in proximity thereto. In many elastomer reactors, particularly butyl polymerization reactors, internal tubes are provided for transporting the reactants throughout the reactor. As used herein, both the interior and exterior surfaces of these tubes are considered a "reactor wall" or "wall of a reactor."

As used herein, a "vibrator" refers to any device or device(s) (e.g., a vibration assembly system) that can induce a vibration in a reactor wall, in which the amplitude and frequency of vibration can be substantially reproduced over a period of time. In certain embodiments, the vibrator is positioned directly on, or in structural proximity to a wall of the reactor so as to create a vibration in the reactor wall where fouling mitigation is desired, while minimizing the impact on the remainder of the reactor.

As used herein, the term "industrial-scale" refers to a production scheme in which elastomers (e.g., butyl rubber) are produced on a continuous basis (with the exception of necessary outages for plant maintenance) over an extended period of time (e.g., over at least a week, or a month, or a year) with the expectation of generating revenues from the sale or distribution of the elastomer. Production at an industrial scale is distinguished from laboratory or pilot plant settings which are typically maintained only for the limited period of the experiment or investigation, and are conducted for research purposes and not with the expectation of generating revenue from the sale or distribution of the elastomer produced thereby.

Reference will now be made to various aspects of the present application in view of the definitions above.

One aspect of the presently disclosed subject matter provides a method of reducing fouling in an elastomer polymerization process that includes providing a reactor capable of housing an industrial-scale elastomer polymerization reaction, and vibrating a wall of the reactor to reduce accumulation of elastomer on the wall. In one embodiment, the reaction is an industrial scale butyl polymerization reaction, and the reactor is a butyl polymerization reactor.

Another aspect of the presently disclosed subject matter provides an elastomer polymerization system. They system includes an elastomer polymerization reactor (e.g., a butyl polymerization reactor used to produce butyl rubber) capable of housing an industrial-scale elastomer polymerization reaction, and a vibrator capable of vibrating a wall of the reactor to reduce accumulation of elastomer on the wall.

The vibrator can be positioned on one or more mechanical components through which the dynamic force from the vibrator is transmitted to a wall of the reactor in which fouling would occur with minimum loss. In one embodiment the vibrator is placed on the tube-sheet, i.e. the structural member inside the reactor in which the small-diameter tube reactors are mechanically connected. Alternatively, or in addition, the vibrator can be applied to the exterior vessel wall or shell. The vibrator can be applied to other locations within the reactor as well.

Various types of vibrators can be used in accordance with the present invention. In one embodiment, the vibrator can be selected from a pneumatic air piston vibrator, a pneumatic turbine vibrator, a pneumatic roller or ball vibrator, a eccentric-electrical-motor vibrator, a electromagnetic shaker, and a piezo stack. In a preferred embodiment, the vibrator is a pneumatic impact vibrator.

The methods and systems of the presently disclosed subject matter are particularly applicable to butyl polymerization reactors that are employed to synthesize butyl rubber (e.g., halogenated butyl rubber). Any reactor that can be used to synthesize butyl rubber at an industrial scale can be employed. The reactor can be, for example, a one-tube pass system reactor, including the reactors disclosed in U.S. Pat. No. 2,474,592. Alternatively, the reactor can be a two-tube pass system, including the reactors disclosed in U.S. Pat. No. 5,417,930.

Another aspect of the presently disclosed subject matter provides a method of synthesizing butyl rubber that includes providing a supply of a isobutylene monomer, a supply of a diolefin, and a supply of a catalyst, introducing the supply of isobutylene monomer, the supply of diolefin, and the supply of catalyst to a polymerization reactor under conditions suitable to polymerize the isobutylene monomer and synthesize butyl rubber, and vibrating a wall of the reactor to reduce accumulation of butyl rubber. The vibration in the reactor wall mitigates rubber fouling and increases the service time of the reactor. Furthermore, a Friedel-Crafts type catalyst can also be introduced to the polymerization reactor. Because butyl polymerization reactions are generally highly exothermic, a cooling fluid (e.g. ethylene) can be used to remove heat from the reactor. The reactor can be in the form of a jacketed vessel and the cooling fluid is introduced to an outer jacket of the jacketed vessel.

Another aspect of the presently disclosed subject matter provides a butyl rubber synthesizing system. The system includes a supply of a isobutylene monomer, a supply of a diolefin, a supply of a cooling fluid, and optionally, a supply of a catalyst (e.g. a Friedel-Crafts type catalyst), a jacketed polymerization reactor capable of receiving the supply of isobutylene monomer, the supply of diolefin, the supply of cooling fluid and optionally, the supply of catalyst under conditions suitable to polymerize the isobutylene monomer and synthesize butyl rubber; and a vibrator, positioned with respect to the jacketed polymerization reactor to vibrate at least one wall of the reactor.

As noted above, the methods and systems of the presently disclosed subject matter are applicable to any elastomer reactor or synthesis equipment in which fouling is a problem. In particular embodiments the elastomer reactor or synthesis equipment is a butyl polymerization reactor.

For purposes of illustration, and not limitation, an exemplary butyl polymerization reactor is shown in FIG. 1, and disclosed in greater detail in U.S. Pat. No. 2,474,592, which is hereby incorporated by reference. Numeral 11 refers to a one-tube pass system, tubular reactor. The reactor is provided with a tube bundle (12) with tubes (13) extending vertically therethrough. A tube bundle (12) encloses a cylindrical space (14) at the bottom of which is located a mixing device or impeller (15) which is actuated through shaft (16) by prime mover (17). Leakage of the contents of reactor (11) is prevented by a stuffing box (18) with suitable packing gland and packing material (19).

The reactor shown in FIG. 1 is provided with an inlet tube (20), into which hydrocarbons are introduced and catalyst injection tubes (21) in which a catalytic solution is introduced into the reactor. An outlet (22) located in the uppermost portion of the reactor vessel (11) allows drawoff of elastomer products as a suspension in the unreacted hydrocarbons and diluent. Stuffing box (18) is provided with a channel (23) which terminates in a chamber (24) which in turn is in communication with the interior of the reactor vessel (11). Channel 23 is connected by way of line (25), pump (26) and chiller (27) to diluent storage vessel. (28). Tube bundle (12) is surrounded by a cooling jacket with inlet 29 and outlet 30 for the cooling fluid.

Figure 2:
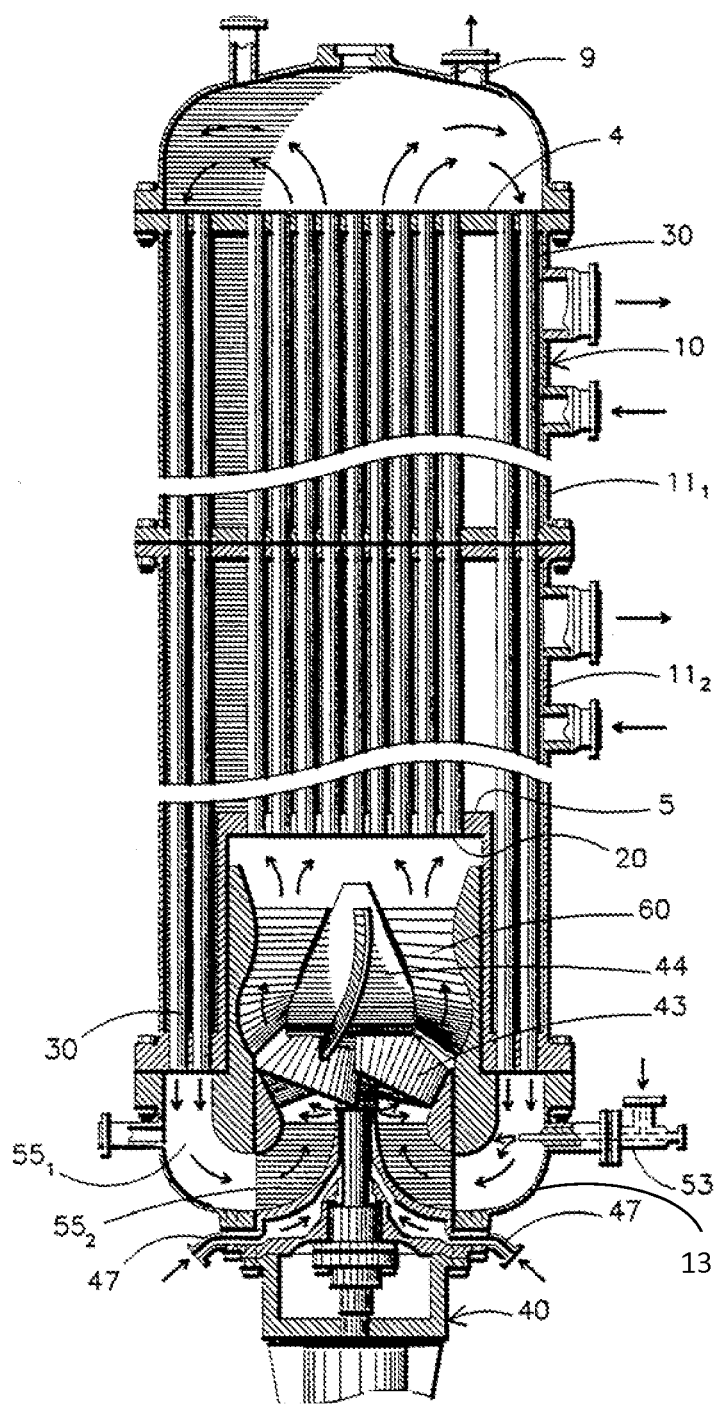
FIG. 2 shows a two-tube pass system butyl polymerization reactor, as originally disclosed in U.S. Pat. No. 5,417,930.
Figure 3:
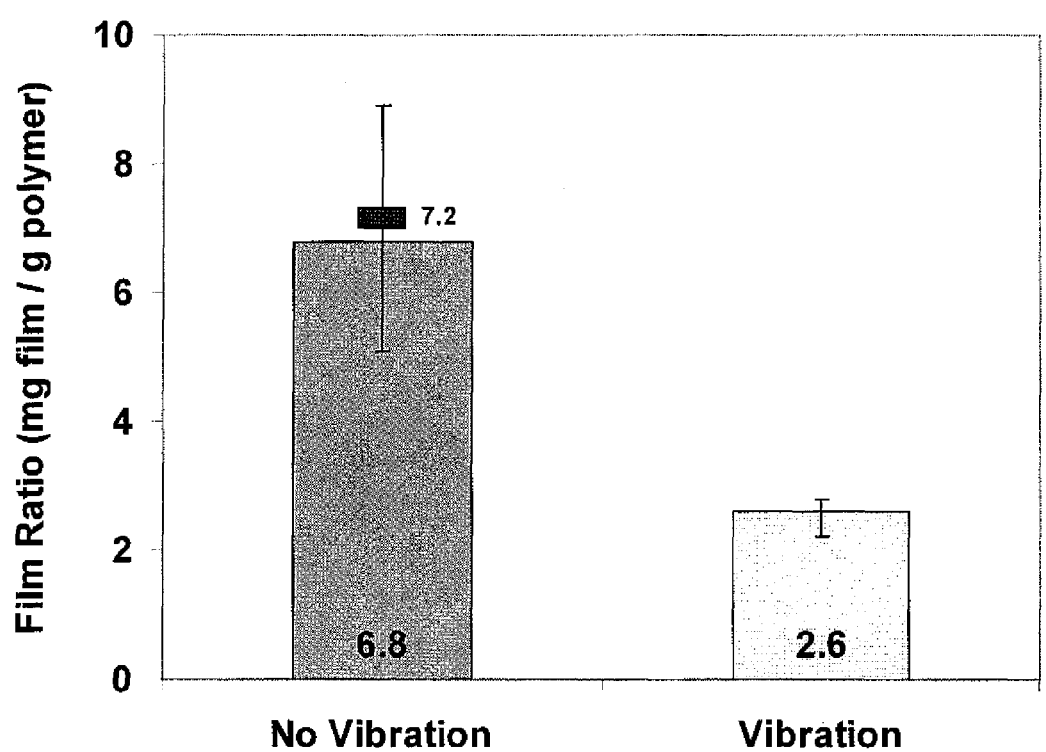
FIG. 3 is a graph demonstrating the reduction of fouling achieved upon applying vibration to a continuous isobutylene, isoprene copolymerization reactor, as described in Example 1 below.

For purposes of illustration, and not limitation, another type of butyl rubber reactor is shown in FIG. 2, and disclosed in greater detail in U.S. Pat. No. 5,417,930, which is hereby incorporated by reference. This particular reactor is known as a two-tube pass system reactor. A catalyst is introduced into the reactor (10) via inlet (53) fitted with tube bundle (3) with the ends of tubes (20) in tube bundle (30) secured in tube sheets (5) and (9). Hydrocarbon feed and diluent are introduced into the reactor (10) via inlets (47), the feed entering into the reactor through a "feed slot" area bounded on the upper side by the lower face of the rotating impeller (43) and on the lower side by the bottom cover, or suction cover (13) creating in effect a "mole hill." Impeller 43 is fitted with a conical nose cone (44) to eliminate stagnant zones. The reactant hydrocarbons and diluent, after chilling, are brought via cavities and tubes through the cover (13) to the feed slot area, this permitting low pressure drop and improved cooling as the fluid flows through the annular space around the shaft to the feed slot area.

Recycle slurry descends through the tubes of tube bundle (30) passing around and then upwardly via openings ($55_1$, and $55_2$) to pick up and admix with the feed and diluent in the feed slot area; and catalyst is introduced into the reactor via one or a plurality of inlets, e.g., inlet (53). Slurry is picked up at the feed slot area by the rotating blades of impeller (43) and forced upwardly, the liquid exiting, or leaving the mixed flow impeller (43) at an angle inclined away from the axis of rotation. The angle of flow is distinctly different from that of an axial flow impeller, as conventionally used, and this type of flow produces a greater pressure head. The direction of flow, on exiting the impeller, is altered by the vanes of the diffuser (60) which redirects, or turns the flow of liquid back toward the axis of rotation, and stops the spinning flow, or vortex whirl, which normally occurs at the impeller discharge. Thus, the mixed flow pump initially pumps the liquid at an angle away from a straight line drawn through the impeller inlet and point of discharge to the tubes of tube bundle (20), i.e., at an angle greater than 0°, generally from about 5° to about 75°, and the flow is then redirected by the diffuser (60) such that the net effect is that it is essentially axially ejected on discharge to the tube bundle (20). The slurry is pumped upwardly through tubes (20) at high rates in a far more even flow distribution, and there is no cavitation on the impeller blades, or essentially no cavitation at process conditions.

To excite the vibration of the reactor wall efficiently, the vibrator can be positioned on one mechanical component of the reactor through which the dynamic force from the vibrator is transmitted to the wall of the reactor with minimum loss. For example, with reference to FIG. 2, the vibrator can be applied to the exterior vessel was (reference number $11_1$ or $11_2$) and/or the vibrator can be applied to the tubesheet (reference number 4) or exterior vessel wall or shell (11 in FIG. 2). In a preferred embodiment, the vibrator is applied to the tube sheet, yet the vibrator can also be provided in alternative places within the reactor and remain effective.

In accordance with the disclosed subject matter, a vibrating source is provided to vibrate a wall of the reactor and reduce accumulation of elastomer, or other fouling on a wall of the reactor. A vibrator with independent control of frequency and amplitude, and suitable for use with the methods and systems of the presently disclosed subject matter is disclosed in U.S. Pat. No. 7,726,871, which is hereby incorporated by reference. A pneumatic vibrator assembly is disclosed that includes a pneumatic vibrator that generates a vibrational force and a tunable resonator coupled to the pneumatic vibrator to modify the vibrational force generated by the pneumatic vibrator. The resonator includes a housing having a resonance frequency and a frequency adjustor coupled to the housing to adjust a stiffness of the housing to change the resonance frequency of the resonator.

Other suitable vibrators to impart vibration upon a reactor wall are disclosed in U.S. Published Application No. 2007/0267176, which is hereby incorporated by reference. As disclosed therein, mechanical vibration can be applied to the wall of a reactor by any type of vibrator that induces vibration while maintaining structural integrity of the reactor wall. Hence, a variety of devices and systems that are capable of generating sufficient dynamic force at selected frequencies would be suitable. A single device, such as an impact hammer or electromagnetic shaker, or an array of devices, such as hammers, shakers or piezoelectric stacks can be employed as vibrators. An array can be spatially distributed to generate the desired dynamic signal to achieve a suitable vibrational frequency.

As disclosed in U.S. Published Application No. 2007/267175, hereby incorporated by reference, an electromagnet actuator can be driven by controller with a pulse generator. The actuator can be used to attract, for example, a steel ball that is supported spring loaded rod achieve the desired vibration. Alternatively an impactor in the form of a hammer could be employed instead of a steel ball, or a movable support such as a lever, swing arm, plunger or rotating support could be employed in the place of a spring loaded rod as vibrators.

Selection of an appropriate vibrational frequency can be determined by identifying one or more frequencies to impart sufficient energy to prevent buildup on the tube wall while avoiding damage to the reactor. To prevent the fatigue damage to the reactor, the frequencies of the vibrator can be selected, in general, to avoid low-frequency resonance of the reactor tubes or other mechanical component of the reactor below 100 Hz. Ideally, the vibrational frequency will be different from the natural frequency of the reactor wall (e.g., below 100 Hz) as matching the driving frequency to the resident mode of the device may create damage to the reactor parts. In one embodiment, the vibrational frequency ranges from 100 Hz to about 100,000 Hz while avoiding the resonance frequency of the reactor structure.

Fouling mitigation can be achieved based on the selection of the vibration level (amplitude) and frequency of the reactor wall. Usually there is a transmission path from the vibration to the reactor wall, which can affect the vibration of the reactor wall for a given vibrator. In certain embodiments, an impact type vibrator, such as a pneumatic piston vibrator, is employed because it can provide broad band vibration at the vibrator and provide sufficient power. The frequency range of this type vibrator can be, for example from 50 Hz, up to ultrasonic range (as high as 100,000 Hz). In certain embodiments, vibration at higher frequency (e.g., a frequency range greater than 1000 Hz) can be more effective for fouling reduction, as opposed to a lower frequency.

A reactor wall (e.g., a reactor tube) can be subjected to various types of vibrations which are all encompassed by the presently disclose subject matter. As disclosed in International Published Application No. 98/29186, hereby incorporated by reference, a transverse vibration (also known as a flexion or bending vibration) can be applied, which constitutes a periodic bending deformation of the whole structure. Alternatively, or in addition, a torsion vibration can be applied which constitutes a periodic act of twisting or turning one end of reactor wall section (e.g., a reactor tube) in one direction.

Still alternatively, a section vibration can be applied (e.g., a axial or compression vibration) which constitutes a periodic deformation of the transverse section of the reactor wall (e.g., a reactor tube). Section vibrations can be obtained by, for example, a periodic act of compressing one end of, for example, a reactor tube in one direction parallel to the longitudinal axis of the tube, the other end being held motionless or compressed in the opposite direction.

Still alternatively, a skin vibration can be applied, which constitutes a propagation of a distorting wave on the surface of the wall of a reactor section (e.g. a tube wall), while the longitudinal axis reactor section is kept motionless.

Still alternatively, an acoustic or pulsation source can be applied directly to the cooling fluid in the vessel, generating acoustic waves that propagate through the cooling fluid to the reactor tube to cause the vibration of the reactor wall. Still alternatively, the acoustic waves could also be generated and applied to the reaction mixture (slurry) to cause the fluid pulsation within the reactor which is also effective to reduce the wall fouling.

EXAMPLES

The present application is further described by means of the examples, presented below. The use of such examples is illustrative only and in no way limits the scope and meaning of the invention or of any exemplified term. Likewise, the invention is not limited to any particular preferred embodiments described herein. Indeed, many modifications and variations of the invention will be apparent to those skilled in the art upon reading this specification. The invention is therefore to be limited only by the terms of the appended claims along with the full scope of equivalents to which the claims are entitled.

Example 1

Fouling Mitigation for Continuous Isobutylene/Isoprene Copolymerizations

Continuous isobutylene, isoprene copolymerizations were conducted at −95° C. in methyl chloride. The catalyst system used for these polymerizations was EADC (ethyl aluminum dichloride)/HCl. Monomer feeds were prepared with 5 wppm methanol in the feed.

Polymerizations were conducted in a laboratory-scale continuous reactor constructed of stainless steel and designed to permit the introduction of monomer and catalyst feeds as well as the continuous removal of the isobutylene and methyl chloride. Methyl chloride was dried by passing the gas through three stainless steel columns containing barium oxide and were condensed and collected as liquids in the glove box. Alternatively, methyl chloride was dried by the addition of triethylaluminum to the liquid at low temperature and subsequently distilling the methyl chloride from this solution under its own vapor pressure. Isoprene (Aldrich) was either distilled, used as received or purified to remove stabilizers prior to use. Isoprene was charged to the monomer feed at 2.8 wt % with respect to isobutylene. HCl solutions were prepared in either methyl chloride or 134a by dissolving gaseous HCl (Aldrich, 99% pure) into the condensed liquid at low temperature. The concentration of the HCl in these prepared solutions was determined by standard titration techniques.

The slurry copolymerizations were performed by first preparing the monomer and catalyst feeds. The monomer feed was prepared in a glass or metal reservoir and comprised isobutylene, isoprene, methyl chloride and methanol. Monomer feeds were prepared at 22 wt % isobutylene. Isoprene was charged to the monomer feed at 2.8 wt % relative to isobutylene. Methanol was added to the monomer feed at 5 wppm. A catalyst feed was prepared for each copolymerization in a separate reservoir. The catalyst feed was prepared by adding a predetermined amount of the stock HCl solution and a hydrocarbon solution of ethylaluminum dichloride (EADC). The EADC/HCl molar ratio in the catalyst feed for all examples was 3.0.

An initial monomer feed was also prepared and charged into the reactor for the purpose of starting the polymerization run. The concentration of monomer in this initial charge was 10 wt % isobutylene. Isoprene was also charged to this initial monomer feed at 2.8 wt % relative to isobutylene. All feeds were chilled to the same temperature as the reactor using the chilled hydrocarbon bath of the glove box. The temperature of the stirred hydrocarbon bath was controlled to ±2° C. Mixing was provided by a three-bladed impeller mounted on a stainless steel shaft and driven by an external electric motor. The motor was run at 1100 to 1600 rpm. The reactor was also equipped with a thermocouple to monitor the temperature of the reactor contents. All apparatus in liquid contact with the reaction medium were dried at 120° C. and cooled in a nitrogen atmosphere before use. Polymerizations in the blend were conducted at a reactor temperature of about −95° C.±3° C. Near the beginning of the polymerization, the temperature of the bath was lowered a few degrees to provide an initial difference in temperature between the bath and the reactor contents. The copolymerizations were begun by introducing the catalyst. The catalyst flow rate was controlled to provide for a constant differential temperature between the reactor and the bath to achieve the target polymerization temperature for the run. Optionally, the temperature of the bath was lowered to aid in achieving the polymerization temperature target. Addition of monomer feed from the reservoir was introduced into the reactor approximately 10 minutes after the reaction commenced as evidenced by the formation of precipitated polymer particles (slurry particles). The run was continued until the monomer feed in the reservoir was exhausted or until the desired amount of monomer feed was consumed. Generally, the average monomer conversion in these runs was better than 75% and at times as high as 99%.

At the end of the run, the contents of the reactor were emptied and the polymer film on the wall of the vessel below the vapor-liquid interface was collected, dried and weighed. The total amount of polymer produced during the run was also collected dried and weighed. A film ratio was then calculated for each run by dividing the mass (in milligrams, mg) of the wall film by the mass (in grams, g) of the total amount of polymer produced in the experiment. The film ratios presented below have the units of mg of film per g of polymer produced.

A continuous laboratory reactor (CLR) equipped with a Cleveland VM-25 air-piston vibrator (Cleveland Vibrator Company, Cleveland Ohio) was used to excite vibrations in the reactor. The piston vibrator was attached to the reactor by means of a threaded stainless steel stud, attached to a stainless steel rod. The rod was affixed to the reactor by a threaded connection to a stainless steel block welded to the exterior of the reactor on the portion of the reactor below the bath level. The vibrator was attached to the stud, placed in the desired orientation and locked in place with a washer and nut. Data represented in the plot was produced with the piston vibrator oriented orthogonal to the stirring axis of the reactor. The piston vibrator was driven with pressurized nitrogen gas, plumbed to the device using flexible, pressure rated tubing and fittings. Exhaust from the vibrator was removed from the glove box through flexible tubing. The vibrator was started prior to first addition of catalyst to the reactor and run continuously for the duration of the copolymerization run. After the polymerization run was complete, the vibrator was removed from the reactor Four successful polymerizations were conducted while operating the vibrating device. A film ratio was calculated for each run to reflect the amount of wall film fouling formed during the course of the polymerization. The film ratio is the ratio of the weights of the dried wall film (collected at the end of the polymerization) to that of the total amount of polymer produced during the run and reported in mg of film per gram of polymer produced. A similar polymerization was conducted in the same apparatus without operation of the vibrating device. The film ratio for this run (7.2) was compared to previous runs (6.8) conducted in a similar reactor and without operating a vibrating device (2.6) to provide a set of comparative data. The data for polymerizations with and without operating the vibrating device are shown in FIG. 1. The height of the bar indicates the average of at least 3 runs. The high and low of the data set is indicated by the error bars.

* * *

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of each of which is incorporated herein by reference in its entirety for all purposes.

The invention claimed is:

1. A method of synthesizing butyl rubber in a slurry butyl elastomer polymerization process, comprising:
    (a) providing a feedstream comprising an isobutylene monomer, a supply of a diolefin, and a supply of a catalyst in a liquid diluent;
    (b) introducing the feedstream into a polymerization reactor under conditions with cooling suitable to polymerize the isobutylene monomer and synthesize butyl rubber; and
    (c) vibrating a wall of the reactor to reduce accumulation of butyl rubber on the wall of the reactor.

2. The method of claim 1, further comprising introducing a halogenation reagent to the reactor under conditions suitable to halogenate the butyl rubber.

3. The method of claim 1, wherein the catalyst is a Friedel-Crafts catalyst.

4. The method of claim 1, further comprising introducing a cooling fluid to the reactor to remove heat from the reactor.

5. The method of claim 4, wherein the reactor is a jacketed vessel and the cooling fluid is introduced to an outer jacket of the jacketed vessel.

6. The method of claim 1, wherein vibrating the wall includes applying a mechanical force to the wall.

7. The method of claim 1, wherein vibrating the wall includes applying a vibrator to the wall, wherein the vibrator selected from a pneumatic air piston vibrator, a pneumatic turbine vibrator, a pneumatic roller or ball vibrator, a eccentric-electrical-motor vibrator, a electromagnetic shaker, and a piezo stack.

8. The method of claim 7, wherein the vibrator is a pneumatic impact vibrator.

9. The method of claim 1 in which the butyl rubber is synthesized at a temperature of −90 to −100° C.

* * * * *